E. BOYD.
THILL.
APPLICATION FILED SEPT. 18, 1908.
985,390.
Patented Feb. 28, 1911.
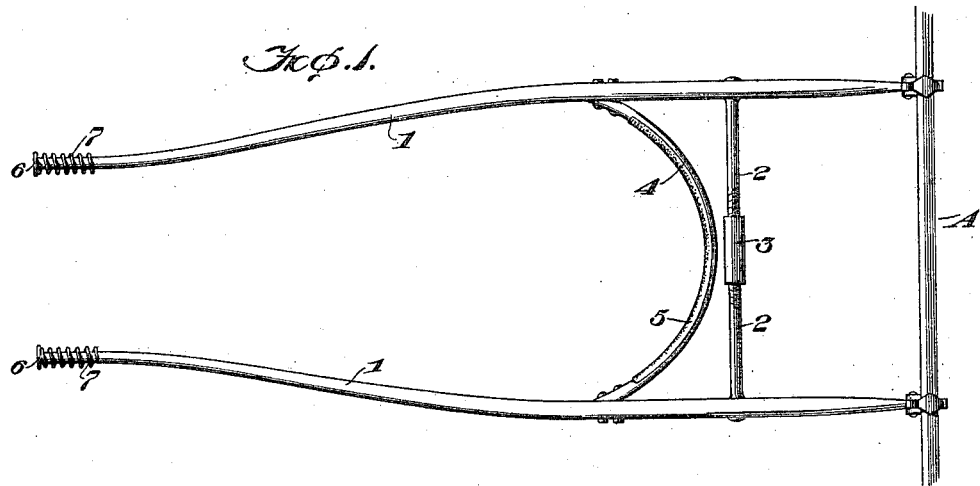
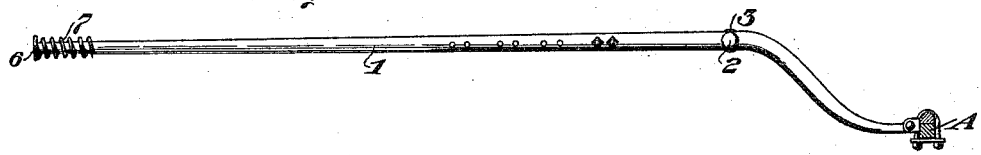
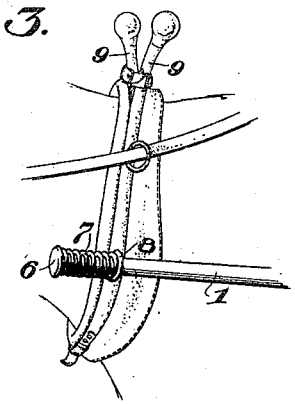
Witnesses
Lloyd W. Patch
J. P. Campbell
Inventor
Eugene Boyd
By Vernon E. Hodge
his Attorney

UNITED STATES PATENT OFFICE.

EUGENE BOYD, OF COLUMBUS, MISSISSIPPI.

THILL.

985,390.  Specification of Letters Patent.  Patented Feb. 28, 1911.

Application filed September 18, 1908. Serial No. 453,573.

*To all whom it may concern:*

Be it known that I, EUGENE BOYD, a citizen of the United States, residing at Columbus, in the county of Lowndes and State of Mississippi, have invented certain new and useful Improvements in Thills, of which the following is a specification.

My invention relates to an improvement in thills, and the object is to provide means whereby draft animals may be attached to any kind of vehicle without the necessity of using all of the harness which is now used for attaching the animal to a vehicle.

The invention consists in certain novel features of construction and combinations of parts which will be hereinafter described and pointed out in the claims.

In the accompanying drawings:—Figure 1 is a view showing the invention applied to a vehicle, Fig. 2 shows the manner of attachment to the hames, and, Fig. 3 is a detail.

A, represents an axle of a wagon, and 1, 1, are the thills which are connected to the axle. The thills are connected at their rear ends by a cross-bar 2, which is provided with a sleeve 3 for adjusting the distance between the two shafts so that when the sleeve is turned in one direction the cross-bar 2 will cause the shafts to spread apart, and when turned in the other direction will draw the shafts together. Connected in advance of the cross-bar to the shafts or thills is a curved bar 4 which is made of spring metal or of wood which is resilient. This bar may be covered with felt or leather padding 5, as the bar is intended to come against the animal in backing the wagon or in holding back in going down an incline or hill. Hooks or knobs 6 are formed at the forward ends of the thills, and coil springs 7, 7, are secured at the forward ends. The ends of the shafts are adapted to pass through rings 8, 8, connected to the hames 9, and the springs 7 are adapted to bear against the rings 8, and the hooked or knobbed ends 6 of the thills to form a cushion to relieve the sudden jerk on the neck and shoulders of the horse in hauling a load.

In the attachment described, the thills are permitted to slide through the rings on the hames when a pulling action is made by the draft animal, and when the load is upheld by the draft animal in going down an incline, the curved bar will come in contact with the hind quarters, and in this way the load will be held back in the same manner as though the usual breeching and harness were used. Again the horizontal attachment of the shafts permits of the thills being adjusted to suit the size of any draft animal, and by the combined arrangement, the back saddle, breeching and hold-backs, traces and belly-band of the usual harness can be entirely done away with, and all that is necessary will be to have the collar, hames, bridle and reins. It will prevent sores forming on the back, hips, and other parts of the draft animal, which same are caused by the present harness.

Having fully described my invention, what I claim as new and desire to secure by Letters Patent, is:—

1. The combination with a collar, of shafts having sliding connection with the collar, and having means on the forward ends thereof whereby draft is applied to the shafts through the part of the collar through which the shafts have sliding connection.

2. The combination with a collar, of shafts slidably connected therewith, and provided with enlargements at their ends through the medium of which draft is applied to the shafts, hold-back means connected with the shafts, and means for adjusting the width of the shafts.

In testimony whereof I affix my signature in presence of two witnesses.

EUGENE BOYD.

Witnesses:
W. R. PWUREE,
A. A. RICHARDS.

---

Copies of this patent may be obtained for five cents each, by addressing the "Commissioner of Patents, Washington, D. C."